United States Patent
Oshita (10) Patent No.: US 9,035,904 B2
(45) Date of Patent: May 19, 2015

(54) INPUT METHOD AND INPUT APPARATUS USING INPUT PAD

(75) Inventor: Kazuhito Oshita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 109 days.

(21) Appl. No.: 13/528,286

(22) Filed: Jun. 20, 2012

(65) Prior Publication Data

US 2012/0327018 A1    Dec. 27, 2012

(30) Foreign Application Priority Data

Jun. 27, 2011    (JP) ................. 2011-141437

(51) Int. Cl.
*G06F 3/0488*    (2013.01)
*G06F 3/041*    (2006.01)

(52) U.S. Cl.
CPC .......... *G06F 3/04886* (2013.01); *G06F 3/0418* (2013.01)

(58) Field of Classification Search
CPC ............ G06F 2203/04105; G06F 2203/04106; G06F 3/041; G06F 3/0414
USPC .................. 345/156–159, 168, 173–177; 178/18.01–19.06
See application file for complete search history.

(56) References Cited

U.S. PATENT DOCUMENTS

| | | | |
|---|---|---|---|
| 6,232,961 B1 * | 5/2001 | Kunimatsu et al. | 345/173 |
| 7,359,999 B2 * | 4/2008 | Sato | 710/67 |
| 7,545,366 B2 * | 6/2009 | Sugimoto et al. | 345/173 |
| 2007/0262968 A1 | 11/2007 | Ohshita et al. | |
| 2009/0189789 A1 * | 7/2009 | Oh | 341/20 |
| 2010/0187216 A1 * | 7/2010 | Komada et al. | 219/443.1 |

* cited by examiner

*Primary Examiner* — Kenneth Bukowski
(74) *Attorney, Agent, or Firm* — Brinks Gilson & Lione (57) ABSTRACT

When it is sensed that a finger is touched to a movable pad and a detection switch is switched on, time that the finger is touched to the sensing surface (Condition (1)), distance in which the finger is moved on the sensing surface (Condition (2)), speed that the finger is moved on the sensing surface (Condition (3)), and acceleration obtained when the finger is moved on the sensing surface (Condition (4)) are referred thereto. When any one of the conditions is satisfied, it is determined to be a pressing operation which is not intended by an operator.

4 Claims, 4 Drawing Sheets

INPUT METHOD AND INPUT APPARATUS USING INPUT PAD

CLAIM OF PRIORITY

This application claims benefit of Japanese Patent Application No. 2011-141437 filed on Jun. 27, 2011, which is hereby incorporated by reference in its entirety.

BACKGROUND

1. Field of the Disclosure

The present disclosure relates to an input apparatus which uses an input pad having a touch sensing apparatus of a capacity type or the like and a pressure sensing apparatus of a mechanical switch type or the like, and, in particular, to an input method and an input apparatus which can prevent an erroneous input signal from being generated because of the malfunction of a pressure sensing apparatus.

2. Description of the Related Art

In an input apparatus disclosed in Japanese Unexamined Patent Application Publication No. 2007-304757, a capacity type input pad is provided in front of a keyboard input apparatus. The input pad can be moved up and down, and a detection switch is provided at the bottom thereof.

The input pad can use the whole area of a sensing surface as a coordinate sensing area by operating the input pad in such a way that a finger is touched on the sensing surface and operating the finger. An L key input unit and an R key input unit are set on the sensing surface of the input pad. It is determined that the finger is touched to any one of the input units based on the variation in capacity. When the input pad is pressed and a detection switch is switched on, a data processing unit generates an input signal which is the same signal obtained when an L button or an R button provided on a mouse of the related art or an input pad of the related art is pressed.

Further, Japanese Unexamined Patent Application Publication No. 2007-304757 discloses a state in which, when the detection switch is switched on while a finger is touched to a part of the input pad, an input signal, which is the same signal obtained when a space key provided on the keyboard apparatus is operated, is generated.

In the input apparatus disclosed in Japanese Unexamined Patent Application Publication No. 2007-304757, the sensing surface of the input pad can be used as a button input area, such as the L button, the R button, or the like, or a space key input area in addition to a coordinate input area. Therefore, the L button, the R button, or the space key can be removed, and an input pad having a large area can be equipped in a limited space.

As described in Japanese Unexamined Patent Application Publication No. 2007-304757, in the input apparatus including the detection switch, there is a case where the input pad is pressed without intention and the detection switch is switched on while inputting coordinate data by touching and moving a finger on the surface of the input pad. In this case, an input signal, which should not be originally generated, is generated as in the case where the L button, the R button, or the space key is pressed, so that an erroneous input operation is performed.

SUMMARY

The present invention provides an input method and an input apparatus, which uses an input pad having a touch sensing apparatus and a pressure sensing apparatus, so that, when the input pad is pressed and a pressure sensing signal is obtained from the pressure sensing apparatus, it can be recognized whether the relevant operation corresponds to an intended input operation or corresponds to a malfunction which has not been intended, thereby preventing an erroneous input signal from being generated.

An input method according to the present invention includes preparing an input pad including a sensing surface having a predetermined area, a touch sensing apparatus for sensing a position of the sensing surface on which an operating object is touched, and a pressure sensing apparatus for sensing that the sensing surface is pressed; and performing a process of validating or invalidating a pressure sensing signal is performed based on variations in a touch sensing signal received from the touch sensing apparatus and obtained before the pressure sensing signal is received, when the pressure sensing signal is received from the pressure sensing apparatus.

In the present invention, when the input pad is pressed and the pressure sensing signal is obtained, the variation in the touch sensing signal, which is obtained immediately before the pressure sensing signal is obtained, is analyzed, so that it is determined whether the operation pressing the input pad is intended by an operator and then performed. Therefore, when the input pad is pressed without the intention of the operator, an erroneous input signal can be prevented from being generated.

In the input method according to the present invention, when it is determined that the operating object has been continuously touched on the sensing surface for longer than a designated time based on the touch sensing signal received from the touch sensing apparatus and when the pressure sensing signal is obtained thereafter, the process of validating or invalidating the pressure sensing signal may be performed.

An input apparatus according to the present invention includes an input pad including a sensing surface having a predetermined area; a touch sensing apparatus for sensing a position of the sensing surface on which an operating object is touched; a pressure sensing apparatus for sensing that the sensing surface is pressed; and a data processing unit for receiving sensing signals from the respective touch sensing apparatus and pressure sensing apparatus. When a pressure sensing signal is received from the pressure sensing apparatus, the data processing unit may perform a process of validating or invalidating the pressure sensing signal based on variations in a touch sensing signal which is received from the touch sensing apparatus and obtained before the pressure sensing signal is received.

DESCRIPTION OF THE EXEMPLARY EMBODIMENTS

Figure 1:
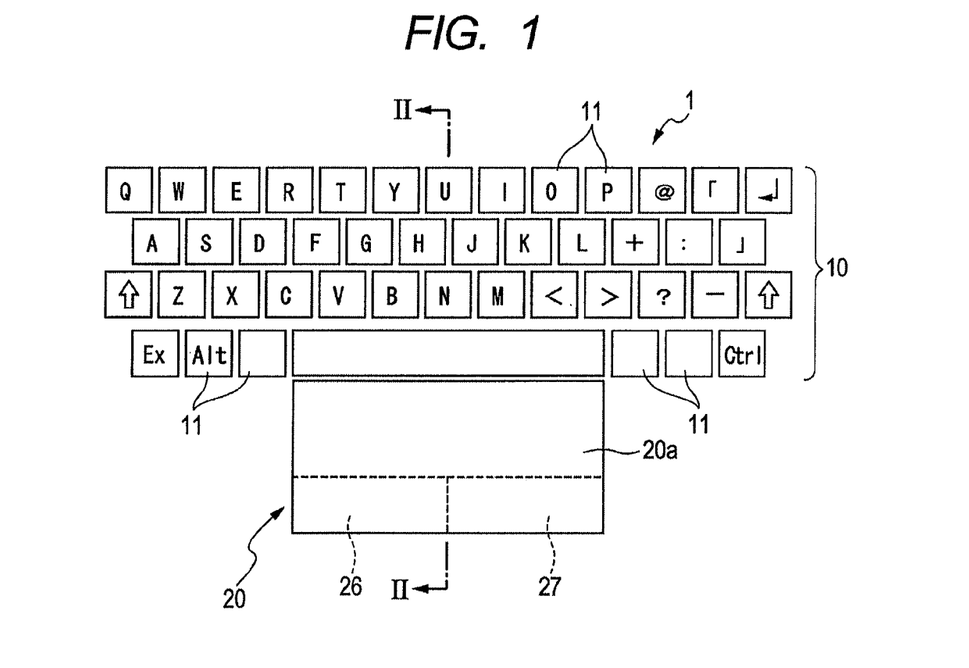
FIG. 1 is a plan view illustrating an input apparatus according to an embodiment of the present invention, together with a keyboard input apparatus.
Figure 2:
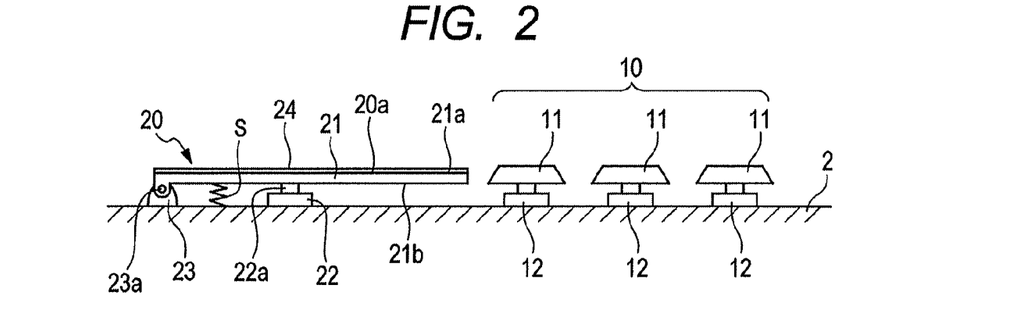
FIG. 2 is a cross-sectional view of the II-II line of FIG. 1.

An input apparatus 1 shown in FIGS. 1 and 2 is equipped to various types of information input apparatuses, such as the operating panel of a personal computer, and the operating apparatus of a game apparatus or a television. In an embodiment below, description will be made of an input apparatus 1 is equipped to the operating panel of a personal computer.

An input apparatus 1 includes a keyboard input apparatus 10 and an input pad 20. In the keyboard input apparatus 10, a plurality of input keys 11 are regularly arranged. As shown in FIG. 2, a plurality of key switches 12 are arranged on the substrate 2 of the input apparatus 1, and the key switches 12 are operated by the respective input keys 11. The respective input keys 11 of the keyboard input apparatus 10 correspond to "alphabet keys", "shift keys", "an enter key", "a control key", and the like.

As shown in FIG. 2, an input pad 20 includes a movable pad 21, and a sensing sheet 24 which functions as a touch sensing apparatus is adhered on the surface 21a of the movable pad. The input pad 20 has a sensing surface 20a, which corresponds to the surface of the sensing sheet 24. As shown in FIG. 1, the input pad 20 is arranged to the front side, which is closer to an operator than that of the keyboard input apparatus 10. The sensing surface 20a has a rectangular shape. However, the sensing surface 20a may have a circular shape, an elliptical shape, or the like.

As shown in FIG. 2, a support medium 23 is provided on the substrate 2, and the end portion of the front side of the movable pad 21 is supported by the support medium 23 via a hinge shaft 23a such that the movable pad 21 can be moved. Meanwhile, instead of the hinge shaft 23a, a part of the movable pad 21 may be formed in the form of a thin wall, and the thin wall portion may function as a hinge such that the movable pad 21 is supported to be freely rotatable. Further, on the contrary to FIG. 2, an end portion of the movable pad 21, which faces the keyboard input apparatus 10 may be supported to be freely rotatable using the hinge shaft 23a or the like.

A mechanical detection switch 22 which functions as a pressure sensing apparatus is installed on the substrate 2, and the actuator 22a thereof faces the bottom surface 21b of the movable pad 21. A reinforcing spring S which is formed of a compression coil spring is provided between the substrate 2 and the movable pad 21, and an appropriate resistance force is generated when the movable pad 21 is pressed using the pressing resistance force of the reinforcing spring S and the actuator of the detection switch 22.

When the sensing surface 20a is pressed by an operating object, such as a finger, the movable pad 21 rotates in the clockwise direction while the hinge shaft 23a functions as a fulcrum, so that the detection switch 22 is switched from an off state to an on state. Meanwhile, a deformation sensing device or the like which senses the deformation of the movable pad 21 when the sensing surface 20a is pressed, may be used as the pressure sensing apparatus instead of the mechanical detection switch 22.

The sensing sheet 24, which is provided on the surface of the movable pad 21 and functions as the touch sensing apparatus, is capacity. The sensing sheet 24 is flexible and is fixed on the surface 21a of the movable pad 21 using bonding means or the like.

In the sensing sheet 24, a plurality of X electrodes are provided in parallel on one surface of an insulating resin film having a predetermined electric permittivity, and a plurality of Y electrodes which are perpendicular to the X electrodes are formed in parallel on the other surface. Each detection electrode is provided in the region between adjacent X electrodes or the region between adjacent Y electrodes. Each detection electrode has the same interval from the X electrodes or the Y electrodes, which are adjacent to the detection electrode in both sides, and is provided in parallel to the X electrodes or the Y electrodes. The cover layer of the resin film is provided on the outermost surface of the sensing sheet 24.

Figure 3:
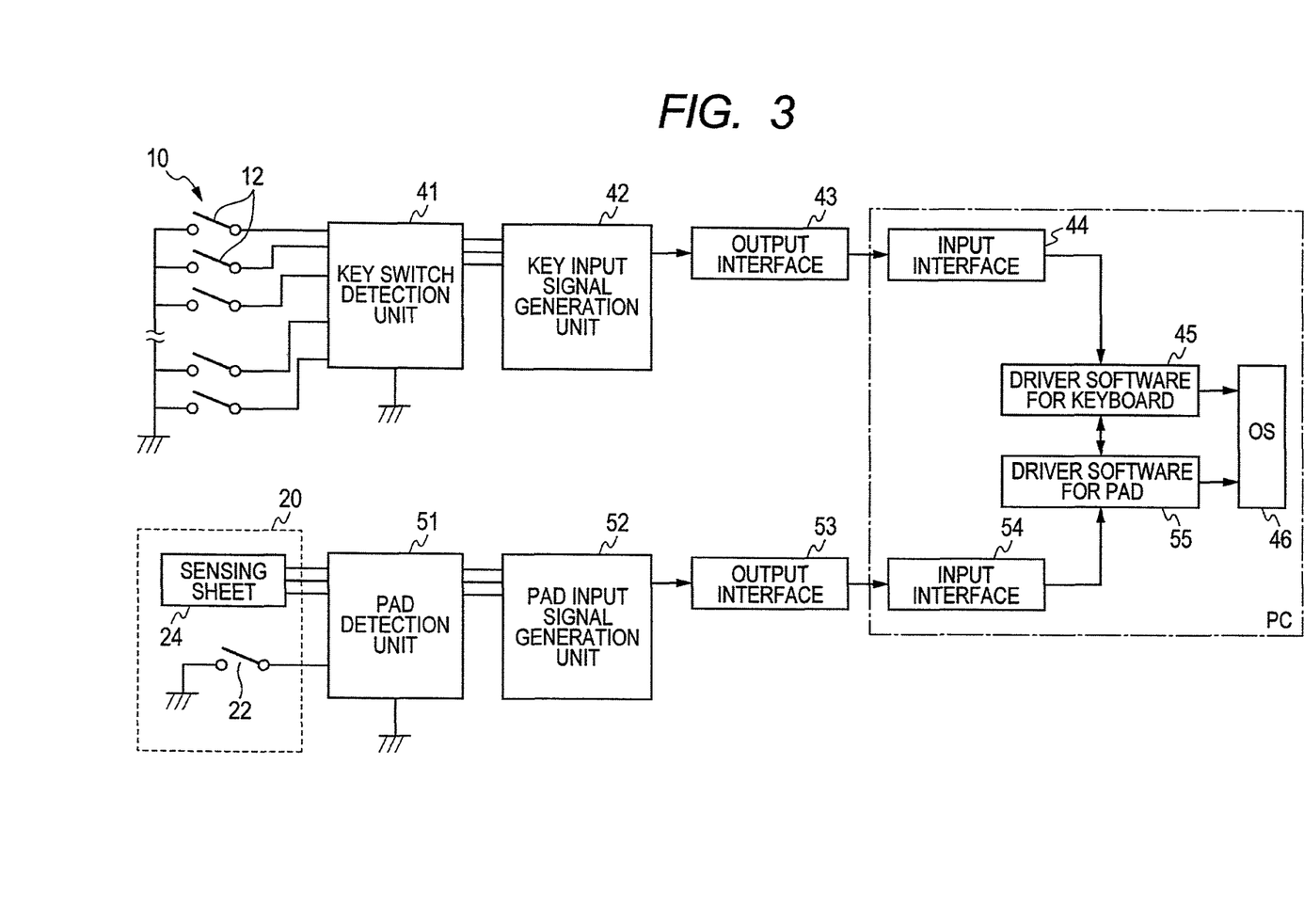
FIG. 3 is a circuit block diagram illustrating an input pad, the keyboard input apparatus, and a data processing unit.

Using a driving circuit provided in a pad detection unit 51 shown in FIG. 3, the plurality of X electrodes are sequentially selected, electric potential is supplied to the selected electrode, and the X electrodes which are not selected are set to ground potential. At a timing that is different from that of the selection of the X electrodes, the Y electrodes are sequentially selected, electric potential is supplied to the selected Y electrode, and the Y electrodes which are not selected are set to ground potential.

A capacity is formed between the X electrode and the detection electrode which is adjacent to the X electrode. Therefore, if pulsed electric potential is supplied to the selected X electrode, current momentarily flows from the selected X electrode to the detection electrode which is adjacent to the X electrode at the timing of the rising edge and the falling edge of the electric potential. When a finger which is a conductive operating object touches the cover of the surface of the sensing sheet 24, the finger faces the X electrodes over a comparatively wide area. Therefore, if electric potential is supplied to the X electrode which the finger faces or the X electrodes which are present on a position which is adjacent to the finger, a large amount of current flows momentarily from the selected X electrode to the finger at the timing of the rising edge and the falling edge of the electric potential, so that the amount of current which flows to the detection electrode which is adjacent to the selected X electrode is decreased.

The pad detection unit 51 shown in FIG. 3 can sense a coordinate position in the X direction corresponding to the sensing surface 20a touched by the finger based on information indicative of the selected X electrode and the amount of current obtained from the detection electrode. In the same manner, the pad detection unit 51 can sense a coordinate position in the Y direction touched by the finger based on information indicative of the selected Y electrode and the amount of current obtained from the detection electrodes.

In the circuit block diagram shown in FIG. 3, the inside of the range surrounded by chained lines corresponds to the circuit configuration of the main PC of the personal computer.

The output obtained by switching each key switch 12 of the keyboard input apparatus 10 is supplied to a key switch detection unit 41 provided in the keyboard input apparatus 10. The key switch detection unit 41 includes a power circuit which supplies current to each key switch 12, and a detection circuit which detects a switched-on key switch 12 and then generates a key input signal. The key input signal obtained by the key switch detection unit 41 is supplied to the key input signal generation unit 42.

The key input signal generation unit 42 performs conversion on a plurality of key input signals using a predetermined format, and supplies the resulting key input signals to the input interface 44 of the main PC of the personal computer via an output interface 43. In the main PC of the personal computer, keyboard driver software 45 is installed, and the formatted key input signals are transferred for a processing operation performed by the keyboard driver software 45.

In the processing operation performed by the keyboard driver software 45, the key input signals are converted into keyboard input signals which conform to the standard of an Operating System (OS) 46, and then the resulting signals are supplied to the OS 46.

The output sensed by the sensing sheet 24 which is the touch sensing apparatus and the output obtained by switching the detection switch 22 are supplied to the pad detection unit 51 which is established in the sensing sheet 24. The pad detection unit 51 is provided with an X driver which selects an X electrode and supplies electric potential to the selected X electrode and a Y driver which selects a Y electrode and supplies electric potential to the selected Y electrode. The pad detection unit 51 is provided with a detection circuit which detects the variation in the amount of current obtained from the detection electrodes of the sensing sheet 24, and a detection circuit which detects detection output obtained by the detection switch 22.

The detection output obtained by the pad detection unit 51 is supplied to a pad input signal generation unit 52. The pad input signal generation unit 52 recognizes a position on which the finger is touched as the absolute coordinate data of the sensing surface 20a, and then generates the touch sensing signal of the absolute coordinate data. Further, the pad input signal generation unit 52 generates a pressure sensing signal when the detection switch 22 is switched on. The touch sensing signal and the pressure sensing signal are formatted using a predetermined bit input signal, and then supplied to the input interface 54 in the main PC of the personal computer via the switch output interface 53.

A pad driver software 55 is installed in the main PC of the personal computer, and the input signal supplied to the input interface 54 is transferred for the processing operation performed by the pad driver software 55.

In the processing operation performed by the pad driver software 55, the touch sensing signal of the absolute coordinate data, which was supplied from the pad input signal generation unit 52, is converted into coordinate data which conforms to the specification of the OS 46, and then supplied to the OS 46. For example, the pad driver software 55 converts the touch sensing signal into the touch sensing signal of relative coordinate data which corresponds to a signal indicative of a movement direction and a movement distance, obtained when a finger which is touched to the operation surface 20a is moved, based on the absolute coordinate data supplied from the pad input signal generation unit 52, and then supplies the resulting touch sensing signal to the OS 46.

Further, when the detection switch 22 is switched on and the pressure sensing signal is obtained, based on the position of the sensing surface 20a on which the finger is touched at that time, the pad driver software 55 generates an input signal corresponding to an operation of the button of a mouse using a format which conforms to the specification of the OS 46, and then notifies the OS 46 of the input signal.

According to the embodiment, the processing operation chiefly performed by the keyboard driver software 45 and the pad driver software 55 corresponds to the data processing unit.

The input apparatus 1 can change the setting of the pad driver software 55 provided as a data processing unit while referring to the display of the operating screen of the personal computer, and can allocate a sensing function to the sensing surface 20a of the input pad 20. In the example shown in FIG. 1, an L button region 26 having a small area is set in the left side of the sensing surface 20a and an R button region 26 having a small area is set in the right side thereof.

Based on the touch sensing signal obtained from the output sensed by the sensing sheet 24, when it is recognized that a finger is touched to the L button region 26 and when the detection switch 22 is pressed and a pressure sensing signal is obtained, the pad driver software 55 generates an input signal which is the same signal obtained when the L button provided on the mouse or the like is operated, and then supplies the input signal to the OS 46. When it is recognized that the finger is touched to the R button region 27 and when the detection switch 22 is pressed, the pad driver software 55 generates an input signal which is the same signal obtained when the R button provided on the mouse or the like is operated, and then supplies the input signal to the OS 46.

Alternatively, the pad driver software 55 may measure a time corresponding to a pressure sensing signal obtained when the detection switch 22 is pressed and operated, and may allocate a control operation based on the time. For example, regardless of the position of the sensing surface 20a on which a finger is touched, if the time that the detection switch 22 is switched on is shorter or equal to or less than a short first specified time defined in advance, an input signal, which is the same signal obtained when the R button is operated, is generated. If the time that the detection switch 22 is switched on is longer or equal to or greater than a second specified time that is longer than the first specified time, an input signal, which is the same signal obtained when the L button is operated, is generated. In this case, the relationship between the time that the detection switch 22 is switched on and the input signal generated by the L button or the R button may be contrary to the above description.

In any of the above-described settings, when the detection switch 22 is not operated, the entire area of the sensing surface 20a is used as a coordinate input surface. Therefore, by touching a finger on the sensing surface 20a and moving the finger, coordinate data having a predetermined format is generated by the pad driver software 55, and then supplied to the OS 46. Because of the coordinate data, an operation of moving a cursor displayed on the screen of the personal computer, an operation of selecting a menu, or an operation of writing graphics or text is performed.

Figure 4:
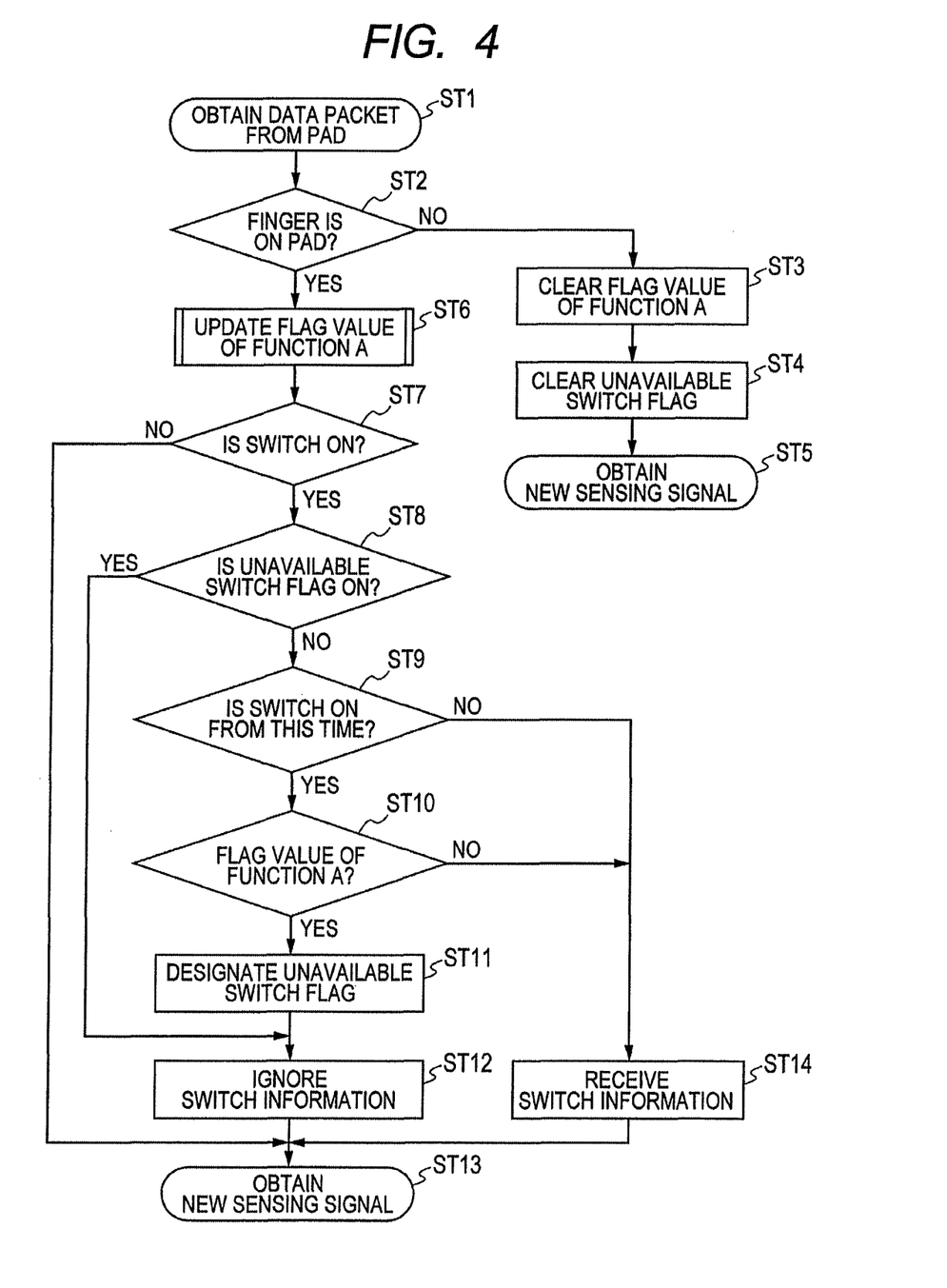
FIG. 4 is a flowchart illustrating a sensing operation of an input method according to the embodiment of the present invention and a processing operation performed by the data processing unit.
Figure 5:
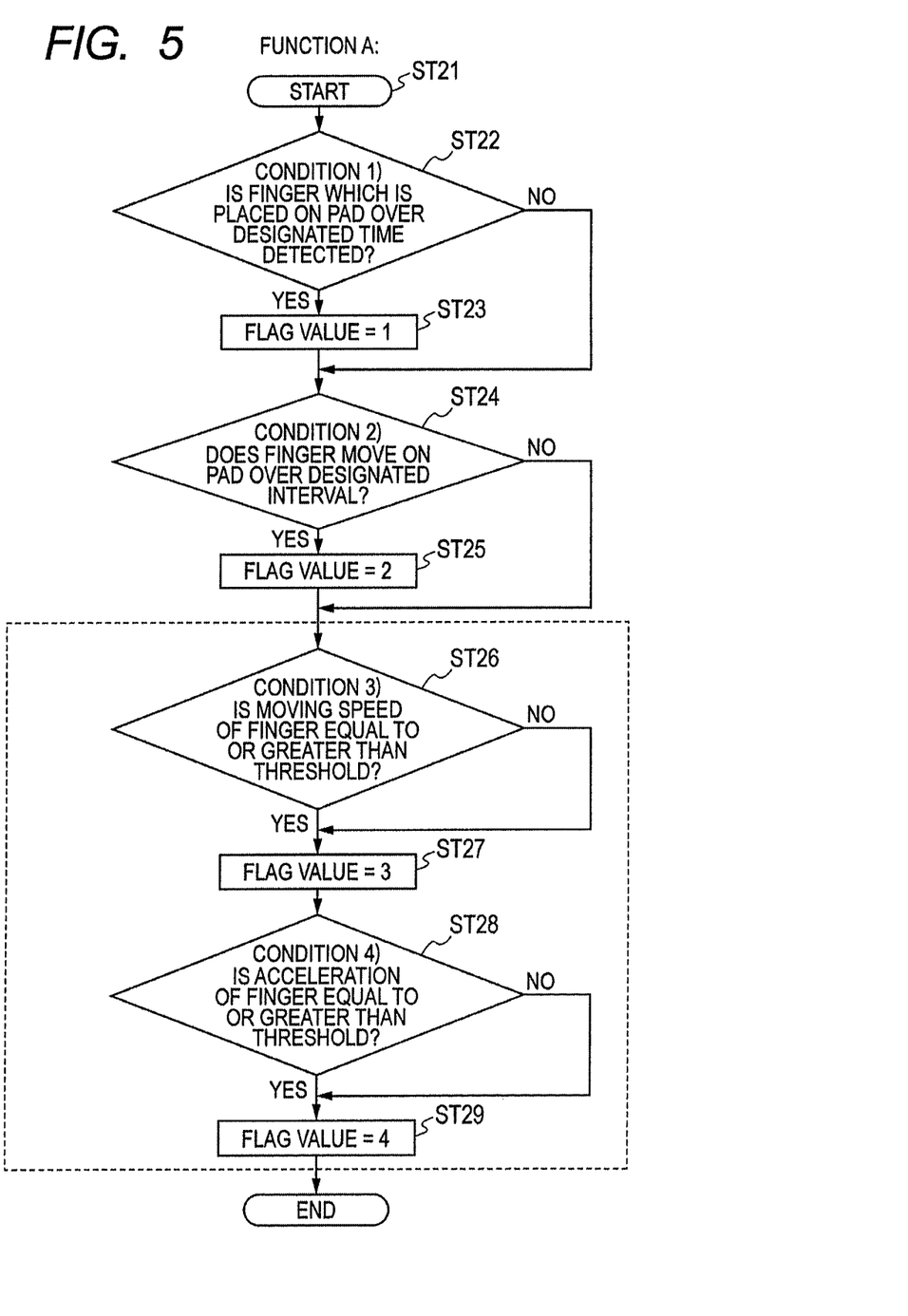
FIG. 5 is a flowchart illustrating the sensing operation and the processing operation performed by the data processing unit.

Next, the input operation of the input apparatus 1 will be described with reference to the flowcharts of FIGS. 4 and 5. In FIGS. 4 and 5, the explanation of each step is described using shortened reference symbol "ST".

In ST1 shown in FIG. 4, the pad driver software 55 performs polling on the pad input signal generation unit 52 with a predetermined period, and the pad driver software 55 periodically and repeatedly obtains the sensing signal of the input pad 20 from the pad input signal generation unit 52.

In ST2, the pad driver software 55 monitors whether the touch sensing signal is obtained from the sensing sheet 24 that is, whether a finger which is a conductive operating object is touched to the sensing surface 20a, based on the sensing signal which is periodically obtained. When the finger is not touched, the process proceeds to ST3 and the flag value of a function A which will be described in FIG. 5 is cleared, the process proceeds to ST4 and a switch disable flag is cleared, and then the process proceeds to a subsequent polling and an obtained sensing signal is updated in ST5.

In ST2, if it is determined that a finger is touched to the sensing surface 20a, the process proceeds to ST6, and the flag value of the function A at that time is updated. The setting of the flag value of the function A is performed based on the flowchart shown in FIG. 5.

In the flowchart shown in FIG. 5, if it is determined that a finger is touched to the sensing surface 20a based on the sensing signal obtained by the pad input signal generation unit 52, a process starts in ST21. Thereafter, it is determined whether the touch state of the finger corresponds to any one of Condition (1) of ST22, Condition (2) of ST24, Condition (3) of ST26, and Condition (4) of ST28. All Condition (1), Condition (2), Condition (3), and Condition (4) means operational conditions in which it cannot be considered that a switch input operation (pushing operation) is intentionally performed on the input pad 20 as a normal operating habit of an operator.

In ST22, the time that the finger is touched to the sensing surface 20a is measured. When a time designated in advance elapses, it is determined to be suitable for Condition (1) and a flag value is set to "1" in ST23. When the operator performs a switch input operation of pressing the input pad 20, the finger is separated from the sensing surface 20a once and then a pressing operation is performed in many cases. From this operational habit, when the time that the finger is touched to the sensing surface 20a is continued at length and then the sensing switch 22 is switched on immediately after the touching, it is determined that the operation does not correspond to an intended switch input operation (pressing operation), and the flag value is set to "1".

In ST1, the pad driver software 55 performs polling on the pad detection unit 51, and the pad driver software 55 obtains the input signal from the pad detection unit 51 with a predetermined period. If it is determined that the finger is continuously touched on the sensing surface 20a in ST2 whenever polling is performed, continuance time that the finger is touched to the sensing surface 20a is counted in ST22. When the continuance time is equal to or longer than a time designated in advance or when the continuance time is beyond the timed designated in advance, the flag value of the function A is updated to "1" in ST6.

In ST24, the movement distance of the finger which is touched to the sensing surface 20a is measured, and it is determined to be suitable for Condition (2) when the finger is moved more than a distance designated in advance, and then the flag value is set to "2" in ST25. When the operator intentionally performs the switch input operation of pressing the input pad 20, it is difficult in practice to perform the pressing operation after moving the finger which is touched to the sensing surface 20a over a long distance. From this operational habit, when the movement distance of the finger which is touched to the sensing surface 20a is long, it is determined that the switch input operation (pressing operation) is not intended even when the sensing switch 22 is switched on thereafter, so that the flag value is updated to "2".

If it is determined that the finger is continuously touched on the sensing surface 20a whenever polling is performed, the movement distance of the finger which is touched to the sensing surface 20a is calculated in ST24. At a timing where the calculated movement distance is equal to or greater than the value designated in advance, or when the calculated movement distance exceeds the value, the flag value of the function A is updated to "2" in ST6.

In ST26, the movement speed of the finger which is touched to the sensing surface 20a is measured. When the movement speed corresponds to a value which is equal to or greater than the value designated in advance, it is determined to be suitable for Condition (3), so that the flag value is set to "3" in ST27. When the operator intentionally performs the switch input operation of pressing the input pad 20, it is difficult in practice for the operator to perform the pressing operation after rapidly moving the finger which is touched to the sensing surface 20a, and, normally, the operator touches the finger on a part of the sensing surface and then performs the pressing operation. From this operational habit, when the movement speed of the finger on the sensing surface 20a is fast, it is determined that the switch input operation (pressing operation) is not intended, so that the flag value is updated to "3".

When it is determined that the finger is continuously touched on the sensing surface 20a in ST2, the variation in coordinates on which the finger is touched is detected whenever polling is performed, and then the movement speed of the finger is calculated based on the elapsed time and the movement distance. At a timing that the calculated movement speed is equal to or greater than a threshold or at a timing that the calculated movement speed exceeds the threshold, the flag value of the function A is set to "3" in ST6.

In ST28, the movement acceleration of the finger which is touched to the sensing surface 20a is calculated. If the acceleration is equal to or greater than the value designated in advance, it is determined to be suitable for Condition (4), so that the flag value is set to "4" in ST29. When the operator performs the switch input operation of pressing the input pad 20, it is difficult in practice to perform the pressing operation after the movement speed of the finger which is touched to the sensing surface 20a changes suddenly. A phenomenon that acceleration changes rapidly normally occurs when the frictional force of the sensing surface 20a becomes large and the finger suddenly stops while inputting the coordinate data by moving the finger which is touched to the sensing surface 20a, so that the input pad is erroneously pressed strongly due to momentum at this time. From this operational habit, when the variation in the movement acceleration of the finger on the sensing surface 20a is great, it is determined that the switch input operation (pressing operation) is not intentionally performed, so that the flag value is set to "4".

When it is determined that the finger is continuously touched on the sensing surface 20a in ST2, the variation in coordinates on which the finger is touched is detected whenever polling is performed, and the movement speed of the finger is calculated based on the elapsed time and the movement distance. Further, acceleration is calculated based on the calculated movement speed and time. At a timing where the value of the acceleration is equal to or greater than the threshold or at a timing where the value of the acceleration exceeds the threshold, the flag value of the function A is updated to "4" in ST6.

In ST6 shown in FIG. 4, if Conditions (1), (2), (3), and (4) of function A are established as shown in FIG. 5, the flag value is set to any one of "1", "2", "3", and "4". Further, if none of Conditions (1), (2), (3), and (4) are established, the flag value is updated to "0" in ST 6.

After the flag value of the function A is updated to any one of "1", "2", "3", and "4" or "0" in ST6 shown in FIG. 4, the process proceeds to ST7 and it is monitored whether the detection switch 22 is pressed and then the pressure sensing signal is obtained when data is obtained. When the pressure sensing signal is obtained, the process proceeds to ST8 and it is determined whether a "switch disable flag" is set in advance. When the "switch disable flag" is not yet set, the process proceeds to ST9 and it is determined whether the detection switch 22 is switched on because the polling is performed, that is, it is determined whether the detection switch 22 is continuously switched on before the polling is performed. When it is determined that the detection switch 22 is switched on for the first time because the polling is performed in ST9, the process proceeds to ST10.

The flag value of the function A is referred in ST10. Here, if the flag value of the function A is updated to any one of "1", "2", "3", and "4", the process proceeds to ST11 and the "switch disable flag" is set. Thereafter, the pressure sensing signal is disabled even when the detection switch 22 is operated in ST12, and then the process proceeds to subsequent polling and a sensing signal is newly obtained in ST13.

From the above description, if it is recognized that any one of Condition (1), Condition (2), Condition (3), and Condition (4) is established, the pressure sensing signal obtained from the detection switch 22 is disabled even when the detection switch 22 is switched on within a designated time after the corresponding Condition is satisfied.

By returning to the flow, if the detection switch 22 is not switched on in ST7, the process proceeds to subsequent polling and a sensing signal is newly obtained in ST13.

If the "switch disable flag" is set at that time in ST8, the process proceeds to ST12 and the pressure sensing signal is disabled even when the detection switch 22 is operated. Thereafter, the process proceeds to subsequent polling in ST13 and a sensing signal is newly obtained.

Meanwhile, the process proceeds to ST4 and the "switch disable flag" is cleared when it is determined that the finger is separated from the sensing surface 20a in ST2.

When is determined that the "switch disable flag" is not set in ST8 and when the detection switch 22 is continuously switched on from when the data is obtained before the polling is performed in ST9, the process proceeds to ST14, and the pressure sensing information becomes valid. In the same manner, even when the flag value of the function A is "0" in ST10, the process proceeds to ST14 and the pressure sensing information becomes valid.

If it is determined that the pressure sensing information is valid in ST14, an input signal which is the same signal obtained when the R button or the L button is pressed is generated based on the setting of the above-described pad driver software 55, and then the input signal is supplied to the OS 46.

From above description, when a touch sensing signal, which is indicative that an operating object, such as a finger, is touched to the sensing surface 20a of the input pad 20, is obtained and, further, the movable pad 21 is pressed and the detection switch 22 is switched on, and when any one of Conditions (1), (2), (3), and (4) shown in FIG. 5 is established, it is determined that the operator does not intend the switch input operation of pressuring the movable pad 21 by the pad driver software 55, so that the pressure sensing signal is disabled and it is determined that the coordinate input operation is performed using the finger which is touched to the sensing surface 20a.

Thereafter, a cursor movement operation, a menu selection operation, an image or letter writing operation or the like is performed. The cursor, the menu, or the image or letter is displayed on the screen of the personal computer based on the operation of the finger.

When the touch sensing signal which is indicative that an operating object, such as a finger, is touched to the sensing surface 20a of the input pad 20, is obtained and, further, the movable pad 21 is pressed and the detection switch 22 is switched on, and when none of Conditions (1), (2), (3), and (4) shown in FIG. 5 are established, it is determined as a pressing operation which intends to switch on the detection switch 22 and an input signal which is the same signal obtained when the R button or the L button is pressed is generated.

Meanwhile, the setting of the flag value of the function A which is referred to in ST10 may be used to determine only Condition (1) and Condition (2), and may not be used to determine Condition (3) and Condition (4).

Further, when Conditions (1), (2), (3), and (4) correspond to a predetermined combination in ST10, the process may proceed to ST11 and the "switch disable flag" may be set.

For example, when two conditions, that is, time that the finger is touched is equal to or longer than a designated length in Condition (1) and the movement distance of the finger is equal to or longer than a designated length in Condition (2), are fixed, the "switch disable flag" is set. Further, when it is determined that the movement distance of the finger is equal to or longer than the designated length in Condition (2) and when the speed condition of Condition (3) or the acceleration condition of Condition (4) is added, the "switch disable flag" is set. Otherwise, both conditions of the speed condition of Condition (3) and the acceleration condition of Condition (4) are fixed, the "switch disable flag" is set.

Further, the input signal obtained when the switch information is received in ST14 is not limited to the input signal which is the same signal obtained when the R button or the L button is pressed, and, for example, an input signal, which is the same signal obtained when any one of the keys of the keyboard input apparatus 10 is pressed, may be generated.

Further, the touch sensing apparatus which is installed on the surface of the movable pad 21 is not limited to the capacity type sensing sheet 24 and may be a resistance sensing type sensing sheet.

It should be understood by those skilled in the art that various modifications, combinations, sub-combinations and alterations may occur depending on design requirements and other factors insofar as they are within the scope of the appended claims of the equivalents thereof.

What is claimed is:

1. An input method comprising:
   preparing an input pad including a sensing surface having a predetermined area, a touch sensing apparatus for sensing a position of the sensing surface on which an operating object is touched, and a pressure sensing apparatus for sensing that the sensing surface is pressed;
   sensing that the sensing surface is pressed; and
   performing a process of validating or invalidating a pressure sensing signal based on variations in a touch sensing signal received from the touch sensing apparatus and obtained before the pressure sensing signal is received, when the pressure sensing signal is received from the pressure sensing apparatus,
   wherein performing the process of invalidating the pressure sensing signal when it is determined that the operating object is moved on the sensing surface at a speed which exceeds a threshold based on the touch sensing signal received from the touch sensing apparatus and when the pressure sensing signal is obtained thereafter.

2. An input method comprising:
   preparing an input pad including a sensing surface having a predetermined area, a touch sensing apparatus for sensing a position of the sensing surface on which an operating object is touched, and a pressure sensing apparatus for sensing that the sensing surface is pressed;
   sensing that the sensing surface is pressed; and
   performing a process of validating or invalidating a pressure sensing signal based on variations in a touch sensing signal received from the touch sensing apparatus and obtained before the pressure sensing signal is received, when the pressure sensing signal is received from the pressure sensing apparatus,
   wherein performing the process of invalidating the pressure sensing signal when it is determined that the operating object is moved on the sensing surface at an acceleration which exceeds a threshold based on the touch sensing signal received from the touch sensing apparatus and when the pressure sensing signal is obtained thereafter.

3. An input apparatus, comprising:
   an input pad including a sensing surface having a predetermined area;
   a touch sensing apparatus that senses a position of the sensing surface on which an operating object is touched;
   a pressure sensing apparatus that senses that the sensing surface is pressed; and a data processing unit that receives sensing signals from the respective touch sensing apparatus and pressure sensing apparatus, wherein, when a pressure sensing signal is received from the pressure sensing apparatus, the data processing unit performs a process of validating or invalidating the pressure sensing signal based on variations in a touch sensing signal which is received from the touch sensing apparatus and obtained before the pressure sensing signal is received, wherein, when it is determined that the operating object is moved on the sensing surface at a speed which exceeds a threshold based on the touch sensing signal received from the touch sensing apparatus and when the pressure sensing signal is obtained thereafter, the data processing unit performs the process of invalidating the pressure sensing signal.

4. An input apparatus, comprising:

an input pad including a sensing surface having a predetermined area;

a touch sensing apparatus that senses a position of the sensing surface on which an operating object is touched;

a pressure sensing apparatus that senses that the sensing surface is pressed; and a data processing unit that receives sensing signals from the respective touch sensing apparatus and pressure sensing apparatus, wherein, when a pressure sensing signal is received from the pressure sensing apparatus, the data processing, unit performs a process of validating or invalidating the pressure sensing signal based on variations in a touch sensing signal which is received from the touch sensing apparatus and obtained before the pressure sensing signal is received, wherein, when it is determined that the operating object is moved on the sensing surface at an acceleration which exceeds a threshold based on the touch sensing signal received from the touch sensing apparatus and when the pressure sensing signal is obtained thereafter, the data processing unit performs the process of invalidating the pressure sensing signal.

* * * * *